May 17, 1960
R. W. HOYER
2,937,139
PURIFICATION OF HYDROCARBONS BY EXTRACTION
WITH PHENOLIC MATERIALS
Filed March 13, 1956
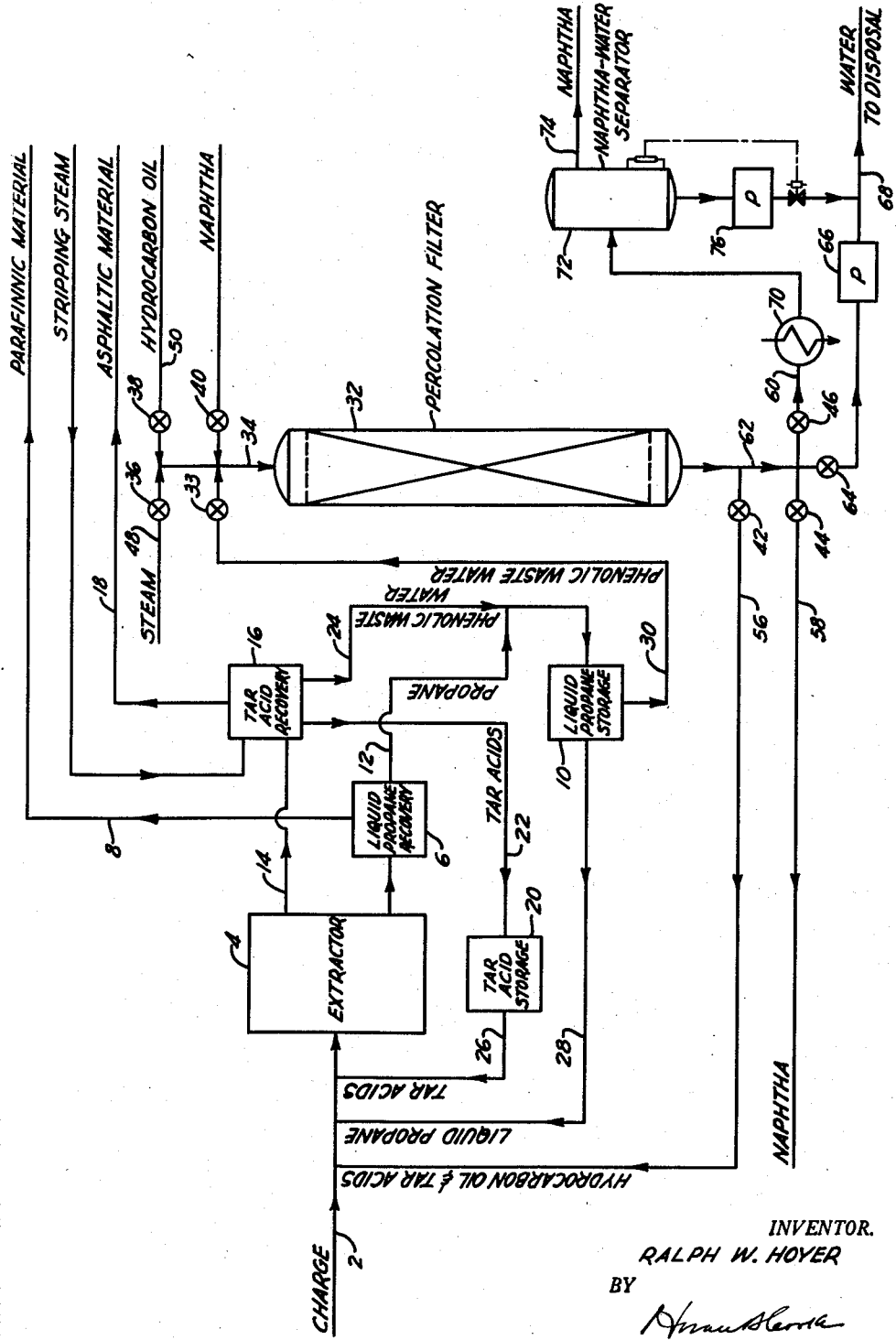
INVENTOR.
RALPH W. HOYER
BY
HIS ATTORNEY

United States Patent Office 2,937,139
Patented May 17, 1960

2,937,139

PURIFICATION OF HYDROCARBONS BY EXTRACTION WITH PHENOLIC MATERIALS

Ralph W. Hoyer, Aldan, Pa., assignor to Gulf Oil Corporation, Pittsburgh, Pa., a corporation of Pennsylvania Application March 13, 1956, Serial No. 571,327

7 Claims. (Cl. 208—324)

This invention has for its object to provide improved procedure for separating phenolic material from aqueous solutions and in particular to a combination of procedural steps involving extraction of lubricating oil stock with phenolic material and separating phenolic material from aqueous solutions containing them.

It is well known that hydrocarbons can be purified by extraction with phenolic materials. These operations usually result in an aqueous solution containing at least some of the phenolic materials used in the extraction. Recovery of the phenolic content of these aqueous solutions is usually a difficult problem. Aqueous solutions of phenolic materials are obtained in other industrial processes and the recovery of the phenolic materials therefrom also is a problem. Recovery is desirable not only because of the value of the phenols but because of the necessity for avoiding polution of streams.

This invention has for its object to provide improved procedure for extracting hydrocarbon fractions with phenolic materials. Another object is to provide improved procedure for separating phenolic materials from aqueous solutions containing them. Another object is to provide a combination process wherein phenolic materials may be recovered from aqueous solutions and economically utilized in extraction of hydrocarbons with phenolic materials. Another object is to improve the state of the art. Other objects will appear hereinafter.

These and other objects are accomplished by my invention which includes contacting an aqueous solution of phenolic material with a solid adsorbent whereby the solid adsorbent takes up or adsorbs a substantial amount of the phenolic material from the aqueous solution, draining the water from the solid adsorbent and contacting the solid adsorbent with a hydrocarbon oil composed primarily of hydrocarbons boiling above gas oil whereby the hydrocarbon oil dissolves or removes a substantial amount of the phenolic material from the solid adsorbent. I have discovered that such hydrocarbons are capable of removing large amounts of phenolic materials from an adsorbent on which they have been adsorbed from aqueous solutions.

In the following examples and description I have set forth several of the preferred embodiments of my invention, but it is to be understood that they are given by way of illustration and not in limitation thereof.

The hydrocarbon utilized to remove the adsorbed phenolic material from the solid adsorbent may be any hydrocarbon oil boiling above gas oil. Thus a liquid petroleum fraction boiling above gas oil, whether paraffinic, naphthenic and/or asphaltic in nature and whether containing residual and/or distillate components, may be employed. For instance a liquid reduced crude containing part or all of the residual components of the crude may be utilized. On the other hand distillate oils may be employed as long as they are largely composed of hydrocarbons boiling above the gas oil range. I prefer to utilize a lubricating oil stock or an off test lubricating oil which is to be purified by extraction with a phenolic material. In this way the phenolic material removed from the solid adsorbent and dissolved in the lubricating oil stock is utilized in the subsequent extraction of the lubricating oil stock with phenolic material. Experimental data indicate that the higher boiling or higher API gravity oils are most suitable for removing adsorbed phenolic materials from the solid adsorbent. The hydrocarbon oils utilized should be primarily composed of hydrocarbons boiling between about 100° C. to 350° C. at 0.1 mm. Hg pressure. When lubricating oil stocks are used, they should be composed primarily of hydrocarbons which boil between about 200° and 275° C. at 0.1 mm. Hg pressure. It is advantageous to use a hydrocarbon which has been dewaxed. My invention also may be carried out using synthetic hydrocarbons boiling in the ranges given above.

The solid adsorbent employed to adsorb the phenolic material from aqueous solutions may be any solid material having a fine pore-like structure such as fuller's earth, bauxite, Florida-Georgia earths, acid treated bentonite, acid treated natural silica-alumina cracking catalysts, silica gel, activated carbon, etc. I prefer to employ a spent or partially spent solid adsorbent which has been previously employed for decolorizing, catalytic cracking, etc. and which has been regenerated one or more times as described in U.S. patent application Ser. No. 518,533, filed June 28, 1955, Carlos B. Rios.

The aqueous solution from which the phenolic materials are to be recovered may be derived from any source. In the purification of various petroleum fractions, it is known to extract with phenol or other phenolic materials such as cresol, wood tar acids, etc. For instance phenol is used to extract lubricating oil stocks to improve viscosity index, oxidation resistance and to reduce carbon and sludge forming tendencies. Steam is used to remove the phenol from the raffinate and extract in such processes and as a result water containing phenol is obtained. My invention is applicable to the separation of phenols from such aqueous solutions. As another example, the "Duo Sol" process for purifying lubricating oils by extraction with a double solvent such as propane and wood tar acids may be mentioned. In this process one or more aqueous streams containing phenolic materials desired from the wood tar acids are obtained and may be contacted with a solid adsorbent to recover these phenolic materials. The same Duo Sol process is also carried out with a mixture of phenols and cresols instead of the wood tar acids. In catalytic cracking of petroleum fractions, oxidation products are formed or are present in the charge stock and these oxidation products are to a considerable extent phenolic in nature. These oxidation products contaminate the water used in the cracking operations and their recovery is desirable from the standpoint of economy and/or avoidance of contamination of streams. Such water may be utilized in the process of my invention. In various other industrial operations such as the manufacture of phenols, aqueous solutions of phenolic materials are obtained and their recovery may be accomplished by utilizing the principles of my invention. My invention is of particular value in connection with the removal of phenolic materials from aqueous solutions containing them in relatively small amounts such as about 40 to about 12,000 parts per million. However, my invention is applicable to the removal of phenolic substances from all aqueous solutions, and it will be understood that lower or higher concentrations of phenolic materials in water may be recovered.

The aqueous solution containing phenolic substance may be contacted with the solid adsorbent in any desired manner. Thus the solid adsorbent may be used in the form of filter beds and the water simply filtered or passed through these filter beds. Also the solid adsorbent and the water may be mixed with each other and the solid adsorbent then separated from the water by settling. This last method of operation may be advantageous where the the solid adsorbent is in such a finely divided condition that filtering through a bed of the finely divided material would be uneconomically slow. Contacting of the aqueous solution with the solid adsorbent is continued until the adsorption of phenolic materials ceases or decreases to an unsatisfactory degree. This can be detected by analysis of the effluent water. Thus the phenolic content of the effluent water will start to rise. The operation is then terminated and the water drained from the adsorbent.

The solid adsorbent is then contacted with the hydrocarbon oil. This contacting may take place in the same manner as the contacting with the aqueous phenolic solution. The hydrocarbon oil is then drained from the adsorbent and the adsorbent is washed with a lower boiling solvent for the hydrocarbon oil such as naphtha, benzene, liquid propane, etc. The absorbent is then steamed to remove the solvent adhering to the washed solid adsorbent and the solid adsorbent may be again contacted with an aqueous solution containing phenolic materials.

In order to have a continuous process it is advantageous to utilize two contacting towers or chambers. One of these will be undergoing regeneration while the other is on stream. When the on-stream tower becomes saturated with the phenolic substance, the flow of aqueous phenolic solution will be switched to the other tower which in the meantime will have been regenerated or put in condition for adsorption of additional phenolic substances as described above. The spent solid adsorbent chamber then will be regenerated while the adsorption is going on in the other tower.

In the accompanying drawing I have illustrated diagrammatically, apparatus in which a preferred modification of my invention may be carried out. Referring to the drawing, a charge stock suitable for manufacture of lubricating oil is introduced via conduit 2 into a "Duo Sol" type extractor 4 where it is extracted with a double solvent (propane and phenolic material such as wood tar acids) in known manner. The two solvents are passed countercurrently to each other and the propane serves to reject asphaltic materials and to dissolve paraffinic materials of high lubricating value. The raffinate, i.e. propane and dissolved paraffinic materials, is treated in propane recovery unit 6 to separate the paraffinic lube oil components from the propane. The lube oil components are removed through conduit 8 and the liquid propane is returned to propane storage tank 10 via conduit 12. The extract phase, i.e. the tar acids and the dissolved asphaltic materials is removed from extractor 4 via conduit 14 and is treated in tar acid recovery unit 16 to separate asphaltic materials (which are removed via conduit 18) from the tar acids. The tar acids are stripped with steam and the purified tar acids are returned to tar acid storage 20 through conduit 22. The condensed stripping steam containing dissolved tar acids is passed through conduit 24 to liquid propane storage 10. Propane and tar acids utilized in the Duo Sol extractor are withdrawn from storage tanks 10 and 20 via conduits 28 and 26 respectively.

The waste water containing phenolic materials in storage tank 10 is withdrawn through conduit 30 and introduced into percolation filter 32 through valve 33 and conduit 34. Percolation filter 32 is filled with pellets, pieces or particles of solid adsorbent such as Florida clay. The water flows through the bed of solid adsorbent and phenolic materials are adsorbed. At this stage of operation valves 36, 38, 40, 42, 44 and 46 controlling flow through conduits 48, 50, 52, 56, 58 and 60 respectively are closed. The water relatively free of phenolic materials is removed from filter 32 via conduit 62 by pump 66 and sent to disposal through conduit 68.

When the adsorptive power of the clay in filter 32 is reduced as evidenced by increase of phenolic materials in the water flowing through conduit 68, valve 33 is closed and water draining from filter 32 is removed by pump 66. Thereafter operation of the pump is terminated and valve 64 is closed. Valves 38 and 42 are then opened to permit hydrocarbon oil to flow through conduits 50 and 34 into filter 32. The hydrocarbon oil then flows through valve 42, conduit 56 and thence to extractor 4 with fresh charge. During passage through filter 32 the hydrocarbon oil dissolves a substantial portion of the phenolic material adsorbed by the clay during the previous operation. When the amount of phenolic material removed by the hydrocarbon oil solvent substantially decreases, valve 38 is closed and after the hydrocarbon oil content of filter 32 has been drained, valve 42 is closed. Valves 40 and 44 then are opened and naphtha is passed through filter 32 to dissolve and remove the hydrocarbon oil retained on the surface or held in the pores of the adsorbent clay. This naphtha is removed through conduit 58 and is sent to naphtha storage or redistilled for re-use. After the hydrocarbon oil has been largely removed from filter 32, valve 40 is closed and after naphtha has drained from filter 32, valve 44 is closed. Then valves 36 and 46 are opened and stripping steam is introduced through conduit 48, valve 36, and conduit 34 and is removed via valve 46 and steam condenser 70. The steam condensate from condenser 70 is introduced into separator 72. Steam passing through fiilter 32 removes residual naphtha which is separated in naphtha separator 72 and removed through conduit 74. Waste water is removed from separator 72 by pump 76 and introduced into waste water line 68.

EXAMPLE

In the following two experiments an off test neutral lubricating oil and a 200 viscosity refined neutral oil having the characteristics shown in Table I were used as solvents to remove phenols from a solid adsorbent. These phenols were absorbed on the solid adsorbent from water from the propane storage tank of a "Duo-Sol" extractor used to prepare a hydrocarbon oil from a reduced crude. This water was condensed from stripping steam used to strip the tar acids used in the "Duo-Sol" process. The solid adsorbent was in the form of particles (16–30 mesh) and was a decolorizing clay which had been repeatedly used to decolorize a lube oil in the preparation of Bright Stock.

Table I

|  | Off Test Neutral | 200 Neutral |
|---|---|---|
| Gravity, ° API | 26.4 | 29.2 |
| Viscosity, S.U.V. Sec. 100° F | 852 | 224 |
| Color, ASTM Union | 3.5 dil. | 3.5 |
| Carbon Residue, Percent | 0.34 | 0.01 |
| Phenols, Percent | trace | trace |
| Overpoint at 760 mm. Hg Pressure, ° C | 370 | 345 |
| Overpoint at 0.1 mm. Hg Pressure, ° C | 127 | 111 |
| 95% Point at 760 mm. Hg Pressure, ° C | 615 | 430 |
| 95% Point at 0.1 mm. Hg Pressure, ° C | 326 | 184 |

The results of these two experiments are given in Table II.

Table II

| | Duration of Run, Hours | 10 | | | | | 13 | | | | |
|---|---|---|---|---|---|---|---|---|---|---|---|
| | Filter Rate, Gal./Cu. Ft./Hr | 0.316 | | | | | 0.316 | | | | |
| | Capacity of Filter: | | | | | | | | | | |
| | Tons | 18 | | | | | 18 | | | | |
| | Cu. Ft | 860 | | | | | 860 | | | | |

| | Total Flow | | Phenolic-Type Compounds | | | Total Flow | | Phenolic-Type Compounds | | |
|---|---|---|---|---|---|---|---|---|---|---|
| | Bbl. | Lbs. | P.p.m. | Lbs. | Wt. Percent of Phenols Charged | Bbl. | Lbs. | P.p.m. | Lbs. | Wt. Percent of Phenols Charged |
| Charge to Filter: | | | | | | | | | | |
| Water from Propane Tank | 64.5 | 22,550 | 9,600 | 216.5 | 100.0 | 83.8 | 29,315 | 9,600 | 281.4 | 100.0 |
| Off-Test Neutral Oil | | | | | | 83.8 | 26,250 | tr. | | 0.0 |
| 200 Vis. Neutral Oil | 64.5 | 19,840 | tr. | | 0.0 | | | | | |
| Naphtha | 13.0 | 3,360 | | | 0.0 | | | | | |
| Steam | 36.0 | 12,590 | | | 0.0 | | | | | |
| Total | 178.0 | 58,340 | | 216.5 | 100.0 | 167.6 | 55,565 | | 281.4 | 100.0 |
| Effluent from Filter: | | | | | | | | | | |
| Water from Propane Tank | 64.5 | 22,550 | 4,200 | 94.7 | 43.8 | 83.8 | 29,315 | 4,200 | 123.1 | 43.8 |
| Off-Test Neutral Oil | | | | | | 83.8 | 26,250 | 3,186 | 83.6 | 29.7 |
| 200 Vis. Neutral Oil | 64.5 | 19,840 | 2,530 | 50.2 | 23.2 | | | | | |
| Naphtha | 13.0 | 3,360 | 3,600 | 12.1 | 5.6 | | | | | |
| Steam Condensate | 36.0 | 12,590 | 5.2 | 0.1 | 0.0 | | | | | |
| Phenols left on Clay | | | | 59.4 | 27.4 | | | | 74.7 | 26.5 |
| Total | 178.0 | 58,340 | | 216.5 | 100.0 | 167.6 | 55,565 | | 281.4 | 100.0 |
| Phenols Removed by Clay | | | | 121.8 | 56.2 | | | | 158.3 | 56.3 |
| Phenols Removed from Clay [1]: | | | | | | | | | | |
| By Off-Test Neutral Oil | | | | | | | | | 83.6 | 52.8 |
| By 200 Vis. Neutral Oil | | | | 50.2 | 41.2 | | | | | |
| By naphtha | | | | 12.1 | 10.0 | | | | | |
| By steam | | | | 0.1 | 0.1 | | | | | |

[1] Based on phenols removed by clay as 100%.

The data in Table II show that both lube oils were quite effective in removing adsorbed phenolic materials from the solid adsorbent. These data also show that the off test neutral oil was more effective in removing phenolic materials than the 200 viscosity neutral oil, i.e. the off test neutral oil removed 52 percent of the adsorbed phenols while the 200 viscosity oil removed 41 percent.

I claim:

1. The process for recovering phenolic material from waste water which comprises contacting the waste water with a solid adsorbent whereby a substantial amount of the phenolic material in the waste water is adsorbed by the solid adsorbent, draining water from the solid adsorbent and removing a substantial amount of the adsorbent and removing a substantial amount of the adsorbed phenol from the solid adsorbent by contacting the solid adsorbent while it still retains water, excepting that water which drains therefrom by gravity, with a lubricating oil fraction composed primarily of hydrocarbons having a boiling point between about 200° and 275° C. at 0.1 mm. Hg.

2. The process for recovering phenolic material from waste water which comprises contacting the waste water with a solid adsorbent whereby a substantial amount of the phenolic material in the waste water is adsorbed by the solid adsorbent, draining water from the solid adsorbent and removing a substantial amount of the adsorbed phenol from the solid adsorbent by contacting it with a liquid petroleum fraction primarily contacting the solid adsorbent while it still retains water, excepting that water which drains therefrom by gravity, with an off test lubricating oil composed primarily of hydrocarbons boiling between about 200° and 275° C. at 0.1 mm. Hg.

3. The process for separating phenolic material from water which comprises contacting the water containing phenolic material with a solid adsorbent whereby a substantial amount of the phenolic material is adsorbed by the solid adsorbent, draining water from the solid adsorbent, contacting the solid adsorbent containing adsorbed phenolic material with a petroleum fraction boiling predominantly in the lubricating oil boiling range whereby the phenolic material adsorbed on the solid adsorbent is dissolved in the petroleum fraction, withdrawing said petroleum fraction from the adsorbent, treating the solid adsorbent containing adherent petroleum fraction boiling in the lubricating oil range with a lower boiling petroleum fraction whereby the petroleum fraction boiling in the lubricating oil range is dissolved therein, draining the lower boiling petroleum fraction from the solid adsorbent, subjecting the solid adsorbent to a treatment with steam whereby adherent lower boiling petroleum fraction is removed therefrom and extracting the petroleum fraction boiling predominantly in the lubricating oil boiling range with a larger amount of phenolic material.

4. In a process for purifying a hydrocarbon lubricating oil stock by extraction with a phenolic material in which process water is obtained containing a small amount of phenolic material, the improvement which comprises contacting the water containing a small amount of phenolic material with a solid adsorbent whereby the solid adsorbent adsorbs a substantial amount of phenolic material, draining water from the solid adsorbent, contacting the adsorbent with a hydrocarbon lubricating oil stock whereby a substantial amount of the phenolic material is dissolved in the lubricating oil stock, withdrawing the lubricating oil stock from the adsorbent and then extracting the lubricating oil stock containing the dissolved phenolic material with a larger amount of phenolic material in order to purify the lubricating oil stock containing the phenolic material dissolved from the solid adsorbent.

5. In a process for purifying a hydrocarbon lubricating oil by extraction with a phenolic material in which process water is obtained containing a small amount of phenolic material, the improvement which comprises contacting the water containing a small amount of phenolic material with a solid adsorbent whereby the solid adsorbent adsorbs a substantial amount of phenolic material, draining water from the solid adsorbent, contacting the adsorbent with an off test hydrocarbon lubricating oil whereby a substantial amount of the phenolic material is dissolved in the lubricating oil, withdrawing the off test lubricating oil from the adsorbent and then extracting the off test lubricating oil containing the dissolved phenolic material with a larger amount of phenolic material in order to purify the off test lubricating oil.

6. In a process for purifying a hydrocarbon lubricating oil by extraction with a phenolic material in which process water is obtained containing a small amount of phenolic material, the improvement which comprises contacting the water containing a small amount of phenolic material with a solid adsorbent whereby the solid adsorbent adsorbs a substantial amount of phenolic material, draining water from the solid adsorbent, contacting the adsorbent with an off test hydrocarbon lubricating oil whereby a substantial amount of the phenolic material is dissolved in the off test lubricating oil, withdrawing the off test hydrocarbon lubricating oil from the solid adsorbent, washing the solid adsorbent with a lower boiling hydrocarbon, withdrawing the lower boiling hydrocarbon from the solid adsorbent, steaming the solid adsorbent, re-using the solid adsorbent to remove phenolic material from water, and extracting the off test lubricating oil containing the dissolved phenolic material with a larger amount of phenolic material in order to purify the off test lubricating oil.

7. In a process for purifying a hydrocarbon lubricating oil stock by extraction with a phenolic material in which process water is obtained containing a small amount of phenolic material, the improvement which comprises contacting the water containing a small amount of phenolic material with a solid adsorbent which has been substantially spent in a decolorizing process whereby the spent solid adsorbent adsorbs a substantial amount of phenolic material, draining water from the spent solid adsorbent, contacting the spent adsorbent with an off test, heavy hydrocarbon lubricating oil stock whereby a substantial amount of the phenolic material is dissolved in the lubricating oil stock, withdrawing the off test heavy hydrocarbon lubricating oil stock from the solid adsorbent, and then extracting the off test lubricating oil stock containing the dissolved phenolic material with a larger amount of phenolic material in order to purify the off test lubricating oil stock.

References Cited in the file of this patent

UNITED STATES PATENTS

| 1,830,725 | Ulrich | Nov. 3, 1931 |
| 2,098,779 | Gericke et al. | Nov. 9, 1937 |
| 2,254,745 | Jannek | Sept. 2, 1941 |
| 2,343,165 | Adler | Feb. 29, 1944 |
| 2,375,596 | Strickland | May 8, 1945 |
| 2,673,174 | King | Mar. 23, 1954 |
| 2,676,912 | Maisel | Apr. 27, 1954 |

FOREIGN PATENTS

| 450,789 | Great Britain | July 24, 1936 |

UNITED STATES PATENT OFFICE
CERTIFICATE OF CORRECTION

Patent No. 2,937,139                              May 17, 1960

Ralph W. Hoyer

It is hereby certified that error appears in the printed specification of the above numbered patent requiring correction and that the said Letters Patent should read as corrected below.

Column 2, line 50, for "desired" read -- derived --; column 4, line 52, for "absorbed" read -- adsorbed --; column 5, lines 49 and 50, strike out "the adsorbent and removing a substantial amount of"; lines 63 and 64, strike out "contacting it with a liquid petroleum fraction primarily".

Signed and sealed this 18th day of October 1960.

(SEAL)
Attest:

KARL H. AXLINE                                                  ROBERT C. WATSON
Attesting Officer                                               Commissioner of Patents